United States Patent
Okabe

(10) Patent No.: US 11,459,937 B2
(45) Date of Patent: Oct. 4, 2022

(54) RESERVOIR TANK

(71) Applicant: TIGERS POLYMER CORPORATION, Osaka (JP)

(72) Inventor: Seisuke Okabe, Hyogo (JP)

(73) Assignee: TIGERS POLYMER CORPORATION, Osaka (JP)

(*) Notice: Subject to any disclaimer, the term of this patent is extended or adjusted under 35 U.S.C. 154(b) by 0 days.

(21) Appl. No.: 17/516,792

(22) Filed: Nov. 2, 2021

(65) Prior Publication Data

US 2022/0154628 A1    May 19, 2022

(30) Foreign Application Priority Data

Nov. 18, 2020   (JP) ............................. JP2020-191352

(51) Int. Cl.
*F01P 11/02*    (2006.01)

(52) U.S. Cl.
CPC ........... *F01P 11/029* (2013.01); *F01P 11/028* (2013.01)

(58) Field of Classification Search
CPC .......... F01P 11/029; F01P 11/028; F01P 11/02
See application file for complete search history.

(56) References Cited

U.S. PATENT DOCUMENTS

2019/0112966 A1*   4/2019   Schoeneman .......... F01P 11/029

FOREIGN PATENT DOCUMENTS

JP        2005-248753 A      9/2005

* cited by examiner

*Primary Examiner* — Jacob M Amick
(74) *Attorney, Agent, or Firm* — Pearne & Gordon LLP

(57) ABSTRACT

The reservoir tank includes: a tank body that stores cooling fluid; an inflow pipe for feeding the cooling fluid into the tank body; and a discharge pipe for discharging the cooling fluid from the tank body, in which the tank body has at least one tank chamber, a discharge port is provided in a bottom surface of the tank chamber or at a position adjacent to the bottom surface, the discharge pipe is connected to the discharge port, and a shield is disposed above the discharge port so as to cover the discharge port in a plan view.

4 Claims, 5 Drawing Sheets

RESERVOIR TANK

CROSS-REFERENCE TO RELATED APPLICATION

This application claims priority from Japanese Patent Application No. 2020-191352 filed with the Japan Patent Office on Nov. 18, 2020, the entire contents of which is hereby incorporated by reference.

BACKGROUND

1. Technical Field

One aspect of the present disclosure relates to a reservoir tank.

2. Related Art

Reservoir tanks provided in a cooling fluid circuit of liquid-cooled cooling systems are known. The liquid-cooled cooling systems are used for cooling internal combustion engines, electric elements, electronic boards, and the like. In the liquid-cooled cooling system, heat is collected from a member to be cooled by circulating cooling fluid, and the member to be cooled is cooled by dissipating heat from a heat radiator. In the liquid-cooled cooling system, a cooling fluid tank, that is, the reservoir tank, may be provided in the cooling fluid circuit for circulating the cooling fluid. The reservoir tank is used to compensate for a decrease in the cooling fluid due to vaporization or the like, and to absorb a volume change of the cooling fluid due to a temperature change. When air bubbles are generated in the cooling fluid, cooling efficiency may decrease. Therefore, the air bubbles in the cooling fluid may be separated, that is, gas-liquid separation may be performed, by the reservoir tank.

For example, in a technique disclosed in JP-A-2005-248753, rectangular baffle plates are arranged to be in a windmill shape in a specific direction in a reservoir tank body. JP-A-2005-248753 discloses that the reservoir tank can separate the air bubbles from the cooling fluid without increasing water flow resistance and complicating a structure of the reservoir tank.

SUMMARY

The reservoir tank includes: a tank body that stores cooling fluid; an inflow pipe for feeding the cooling fluid into the tank body; and a discharge pipe for discharging the cooling fluid from the tank body, in which the tank body has at least one tank chamber, a discharge port is provided in a bottom surface of the tank chamber or at a position adjacent to the bottom surface, the discharge pipe is connected to the discharge port, and a shield is disposed above the discharge port so as to cover the discharge port in a plan view.

DETAILED DESCRIPTION

Figure 1:
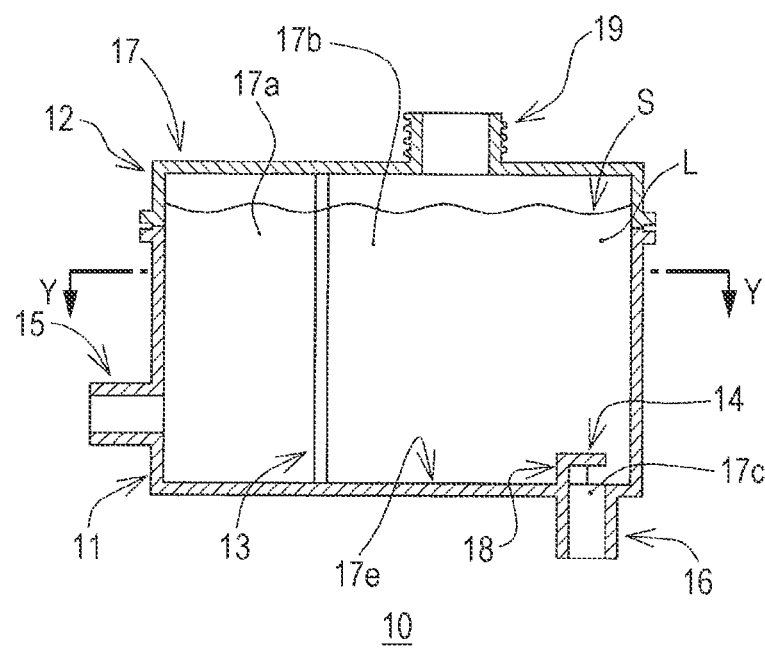
FIG. 1 is a vertical cross-sectional view illustrating a structure of a reservoir tank of a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In recent years, in order to improve performance of the cooling system, there has been a demand to further increase a flow rate of cooling fluid passing through a reservoir tank as in JP-A-2005-248753. However, when the flow rate of the cooling fluid passing through the reservoir tank increases, since the cooling fluid having flowed into the tank body easily entrains air in the tank, air bubbles are generated, and it was found that it was difficult to obtain a gas-liquid separation effect to an expected level.

An object of the present disclosure is to suppress mixing of the air or the air bubbles into the cooling fluid discharged from the reservoir tank.

As a result of diligent studies, the inventors have discovered that when a vortex is generated in the tank, the air is in a tornado shape and is sucked into the discharge port of the cooling fluid. Then, the inventors discovered that such a phenomenon is one of causes of the air being mixed in the cooling fluid.

The inventors conducted further diligent studies. As a result, the inventors have found that it is possible to suppress sucking of the air into the discharge port by providing a shield so as to cover the discharge port of the tank chamber, and by placing the shield at a predetermined distance away from the discharge port, and completed a technique of the present disclosure.

A reservoir tank according to a first aspect of the present disclosure includes: a tank body that stores cooling fluid; an inflow pipe for feeding the cooling fluid into the tank body from, for example, a cooling fluid circuit of a liquid-cooled cooling system; and a discharge pipe for discharging the cooling fluid from the tank body to the cooling fluid circuit. The tank body has at least one tank chamber, a discharge port is provided in a bottom surface of the tank chamber or at a position adjacent to the bottom surface, the discharge pipe is connected to the discharge port, and a shield is disposed above the discharge port so as to cover the discharge port in a plan view.

In the first aspect, the shield is preferably disposed at a position away from the discharge port by a predetermined distance. At this time, a peripheral wall extending in a substantially vertical direction is provided between a part of a peripheral edge of the shield and a part of a peripheral edge of the discharge port facing the part of the peripheral edge of the shield. Further, an opening is provided between the other part of the peripheral edge of the shield and the other part of the peripheral edge of the discharge port facing the other part of the peripheral edge of the shield (second aspect).

Further, in the second aspect, the peripheral wall is preferably located on a central portion side of the tank chamber with respect to a central portion of the shield in a plan view (third aspect).

Further, in the second aspect, it is preferred that the tank chamber is provided with an inflow port through which the cooling fluid flows in, and the peripheral wall is located on a side of the inflow port with respect to a central portion of the shield in a plan view (fourth aspect).

Furthermore, in the second aspect, the peripheral wall is preferably located upstream of flow of a vortex generated in the tank chamber with respect to a central portion of the shield in a plan view (fifth aspect).

According to the reservoir tank according to the first aspect of the present disclosure, it is possible to suppress the air in the tank chamber from being in a tornado shape and being discharged from the discharge port together with the cooling fluid. Therefore, it is possible to suppress the mixing of the air or the air bubbles into the cooling fluid.

Further, according to the second to fifth aspects, it is possible to suppress the air bubbles contained in the cooling fluid flowing into the tank chamber from being directly discharged from the discharge port. Therefore, it is possible to more sufficiently suppress the mixing of the air or the air bubbles into the cooling fluid.

Hereinafter, embodiments of the present disclosure will be described with reference to the drawings, taking the reservoir tank provided in the liquid-cooled cooling system for an internal combustion engine of an automobile as an example. The technique of the present disclosure is not limited to individual embodiments described below, but may also be implemented as modified embodiments below. Applications of the liquid-cooled cooling system are not limited to the internal combustion engine, and may be applications for cooling an electric element such as a power element and an inverter, and an electric component such as an electronic circuit board, and further may be other applications.

Figure 2:
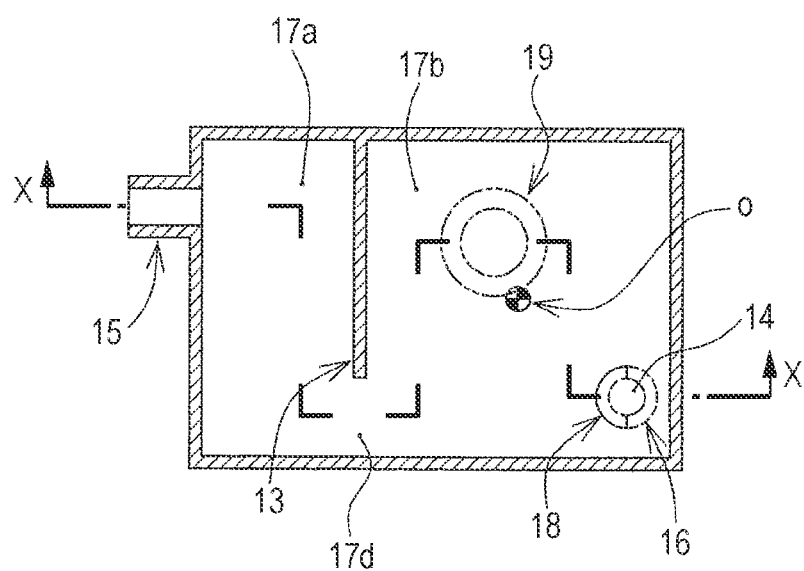
FIG. 2 is a horizontal cross-sectional view illustrating the structure of the reservoir tank of the first embodiment.

FIGS. 1 and 2 illustrate a structure of a reservoir tank 10 of a first embodiment. FIG. 1 illustrates a vertical cross-sectional view of the reservoir tank 10. FIG. 2 illustrates a horizontal cross-sectional view of the reservoir tank 10. The vertical cross-sectional view of FIG. 1 is an X-X cross-sectional view taken along a line X-X of FIG. 2 in a vertical plane. Further, the horizontal cross-sectional view of FIG. 2 is a Y-Y cross-sectional view taken along a line Y-Y of FIG. 1 in a horizontal plane.

The reservoir tank 10 is configured to include a hollow tank body 17 and an inflow pipe 15 and a discharge pipe 16 connected to the tank body 17. The reservoir tank 10 is disposed and connected in the cooling fluid circuit of the liquid-cooled cooling system so that the cooling fluid flows from the inflow pipe 15 into the hollow tank body 17, and flows out from the hollow tank body 17 through the discharge pipe 16.

In the vertical cross-sectional view of FIG. 1, an upper side of the figure shows a vertically upper side. In the present embodiment, a lower case 11 and an upper case 12 are integrated to form the reservoir tank 10. The lower case 11 and the upper case 12 are integrated to form a hollow tank body 17. In the present embodiment, the inflow pipe 15 and the discharge pipe 16 are integrally molded in the lower case 11. Alternatively, the inflow pipe 15 and the discharge pipe 16 may be integrated with the tank body 17 by a manufacturing method different from being integrally molded with the lower case.

The cooling fluid L is stored in the tank body 17. The air is stored in a vertically upper portion of the tank body 17. Although not essential, the tank body 17 may be provided with a filler port 19 for filling with the cooling fluid. A cap C is appropriately provided at the filler port 19.

The tank body 17 has at least one tank chamber 17b. There may be one tank chamber or two or more tank chambers. In the present embodiment, the tank body 17 has a tank chamber 17b and a front tank chamber 17a provided upstream of the tank chamber 17b.

Although not essential, in the present embodiment, the inflow pipe 15 is connected to the front tank chamber 17a. The inflow pipe 15 is preferably connected to the tank body 17 vertically below a liquid level S of the cooling fluid L stored inside the tank body 17.

The discharge pipe 16 is connected to a discharge port 17c provided in the tank chamber 17b. That is, the tank chamber 17b and the discharge pipe 16 communicate with each other through the discharge port 17c. The discharge port 17c is provided in a bottom surface 17e of the tank chamber 17b. The discharge port 17c may be provided at a position adjacent to the bottom surface 17e of the tank chamber 17b.

The tank chamber 17b and the front tank chamber 17a are separated by a partition wall 13. The partition wall 13 is provided with a hole or a slit. Through the hole or slit, the tank chamber 17b and the front tank chamber 17a communicate with each other. The hole or slit serves as an inflow port 17d, and the cooling fluid flows into the tank chamber 17b from the inflow port 17d.

As described above, in the reservoir tank 10 of the present embodiment, the cooling fluid flows from the cooling fluid circuit of the cooling system into the front tank chamber 17a through the inflow pipe 15. Then, the cooling fluid flows from the front tank chamber 17a to the tank chamber 17b through the inflow port 17d. Further, the cooling fluid returns from the tank chamber 17b to the cooling fluid circuit of the cooling system through the discharge port 17c and the discharge pipe 16.

A shield 14 is provided above the discharge port 17c of the tank chamber 17b. As illustrated in FIG. 2, the shield 14 is provided to cover the discharge port 17c in a plan view. Further, as illustrated in FIG. 1, the shield 14 is preferably disposed at a position vertically above the discharge port 17c and away from the discharge port 17c by a predetermined distance. As in another embodiment described below, the shield 14 may be provided adjacent to the discharge port 17c.

The shield 14 suppresses direct flow of the cooling fluid in the vertical direction between an upper space of the tank chamber 17b and the discharge port 17c. The shield 14 is formed of a material that hardly allows gas and liquid to pass therethrough, preferably a material that does not allow gas and liquid to pass therethrough. Typically, the shield 14 is made of the same material as the upper case 12 and the lower case 11.

The shield 14 is provided to cover the discharge port 17c in a plan view. The shield 14 may be smaller or larger than the discharge port 17c as long as it substantially covers the discharge port 17c. It is preferred that the shield 14 and the discharge port 17c have the same size as in the present embodiment because the shield 14 can be easily integrally molded with the lower case 11. Typically, the shield 14 is provided in a plate shape having substantially the same size as the discharge port 17c in a plan view. Note that a shape of the shield 14 does not have to be plate-shaped, may be block-shaped, or may be hollow.

A distance from the upper shield 14 to the discharge port 17c or the bottom surface 17e of the tank chamber is preferably about 0.2 to 1.2 times the diameter of the discharge port 17c. The distance from the shield 14 to the discharge port 17c is preferably set so that an area of a portion opened between the peripheral edge of the shield 14 and the peripheral edge of the discharge port 17c is larger than a cross-sectional area of the discharge port 17c.

Figure 3A:
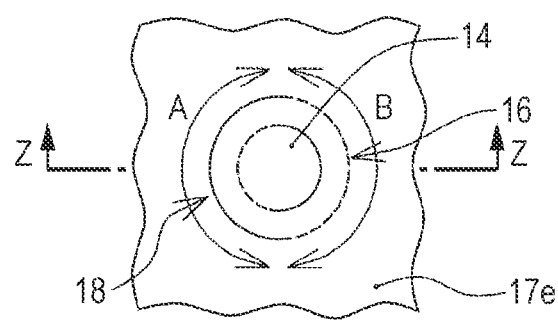
FIGS. 3A and 3B are views illustrating a structure in the vicinity of a shield of the reservoir tank of the first embodiment.
Figure 3B:
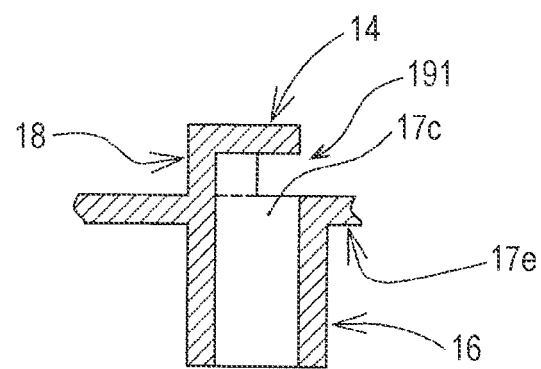

Although not essential, as illustrated in FIGS. 3A and 3B, a peripheral wall 18 extending in the substantially vertical direction is preferably provided between a part of the peripheral edge of the shield 14 (a section indicated by an arrow A in FIG. 3A; hereinafter, appropriately referred to as a section A) and a part of the peripheral edge of the discharge port 17c facing the section A. Further, an opening 191 is preferably provided between the other part of the peripheral edge of the shield 14 (a section indicated by an arrow B in FIG. 3A; hereinafter, appropriately referred to as section B) and the other part of the peripheral edge of the discharge port 17c facing the section B. The peripheral wall 18 is also formed of the same material as the shield 14. Since the peripheral wall 18 is provided, the cooling fluid does not flow into the discharge port 17c in the section A where the peripheral wall 18 is provided. On the other hand, the cooling fluid flows into the discharge port 17c from the section B where the opening 191 is provided.

The peripheral wall 18 is preferably provided to block between the peripheral edge of the shield 14 and the peripheral edge of the discharge port 17c over a length of about ¼ to ⅔, more preferably about ⅓ to ½ of a total peripheral length of the shield 14. The peripheral wall 18 may be used to support the shield 14 with respect to the tank body 17. Further, the shield 14 and/or the peripheral wall 18 may be integrally molded with the tank body 17. Further, the shield 14 and/or the peripheral wall 18 may be formed as a separate member and attached to the tank body 17. The peripheral wall 18 is preferably continuous over the section A. However, the peripheral wall 18 may be provided intermittently in the section A.

Further, although not essential, as in the present embodiment, the section A where the peripheral wall 18 is provided is preferably located on a central portion O side of the tank chamber 17b with respect to a central portion of the shield 14 in a plan view (see FIG. 2).

Further, although not essential, as in the present embodiment, it is preferred that the tank chamber 17b is provided with the inflow port 17d through which the cooling fluid flows in, and the section A in which the peripheral wall 18 is provided is located on the side of the inflow port 17d with respect to the central portion of the shield 14 in a plan view (see FIG. 2).

Figure 4A:
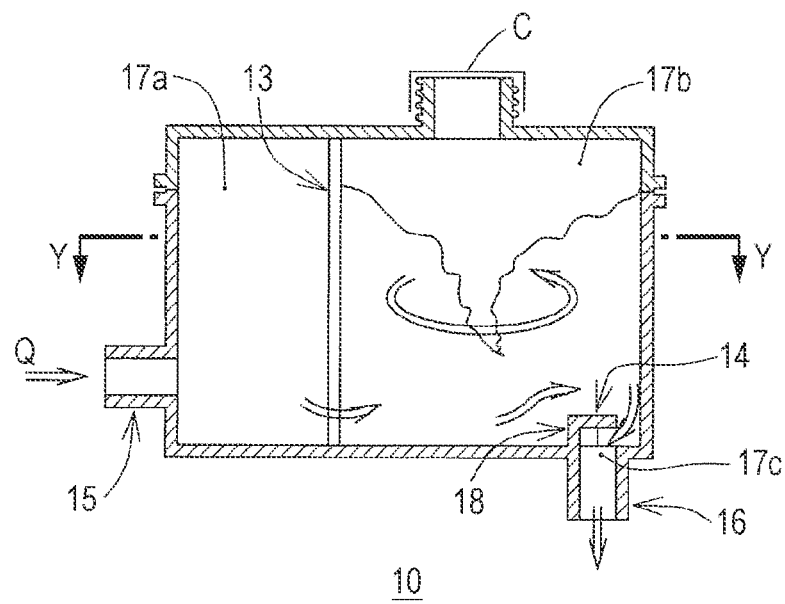
FIG. 4A is a vertical cross-sectional view illustrating an operation of the reservoir tank of the first embodiment.
Figure 4B:
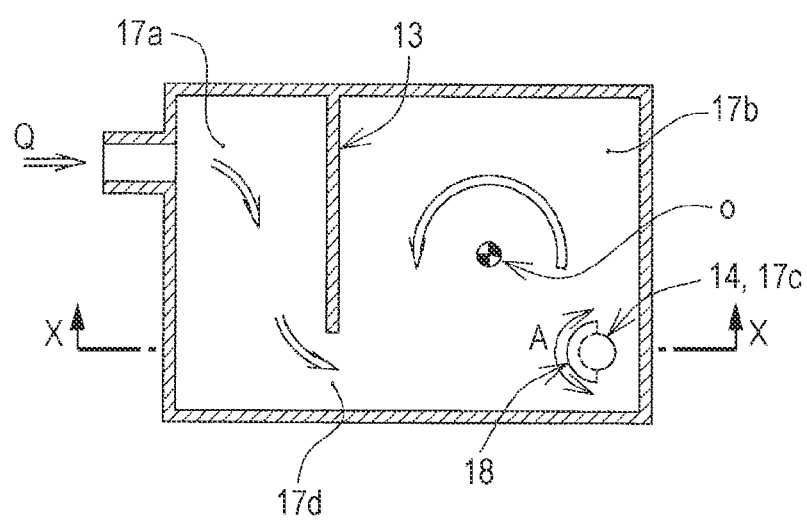
FIG. 4B is a horizontal cross-sectional view illustrating the same.

Further, although not essential, as in the present embodiment, the section A where the peripheral wall 18 is provided is preferably located upstream of the flow of the vortex generated in the tank chamber 17b with respect to the central portion of the shield 14 in a plan view (see FIGS. 4A and 4B).

As long as the tank body 17, the shield 14, the inflow pipe 15, and the discharge pipe 16 of the reservoir tank 10 can be configured, what kind of divided members are specifically used to form the above-mentioned structure of the reservoir tank 10 (how to form the reservoir tank 10 as an assembly of components (parts)) is not particularly limited. In the present embodiment, the above-described structure of the reservoir tank 10 is formed by forming each of the lower case 11 and the upper case 12 obtained when the reservoir tank 10 is divided, and by assembling the formed cases. Alternatively, such a structure may be formed by another member configuration. For example, the above-mentioned structure of the reservoir tank 10 may be formed by dividing the tank body 17 into two by a vertical plane, forming the components so that the shield is a separate member, and assembling the components.

In the first embodiment, a material forming the reservoir tank 10 and a method for manufacturing the reservoir tank 10 are not particularly limited. The reservoir tank 10 can be manufactured by a known material and a known manufacturing method. Typically, the reservoir tank 10 is formed using a thermoplastic resin such as a polyamide resin as a main material. The material, reinforcing structure, and the like of the reservoir tank 10 are determined depending on the type, temperature, pressure, and the like of the cooling fluid to be used. Typically, the reservoir tank 10 can be manufactured by respectively forming members corresponding to the lower case 11 and the upper case 12 by injection molding, and by integrating the members by vibration welding, hot plate welding or the like. In that case, the inflow pipe 15, the discharge pipe 16, the shield 14, the peripheral wall 18, and the filler port 19 are preferably integrally molded with the lower case 11 or the upper case 12. Alternatively, any one of the inflow pipe 15, the discharge pipe 16, the shield 14, the peripheral wall 18, and the filler port 19 may be formed as a separate member and integrated into the lower case 11 or the upper case 12 by later assembly.

Operations and effects of the reservoir tank 10 of the first embodiment will be described. According to the reservoir tank 10 of the first embodiment, it is possible to suppress the air in the tank chamber 17b from being in a tornado shape and being discharged from the discharge port 17c together with the cooling fluid. Therefore, it is possible to suppress the mixing of the air or the air bubbles into the cooling fluid.

Figure 6A:
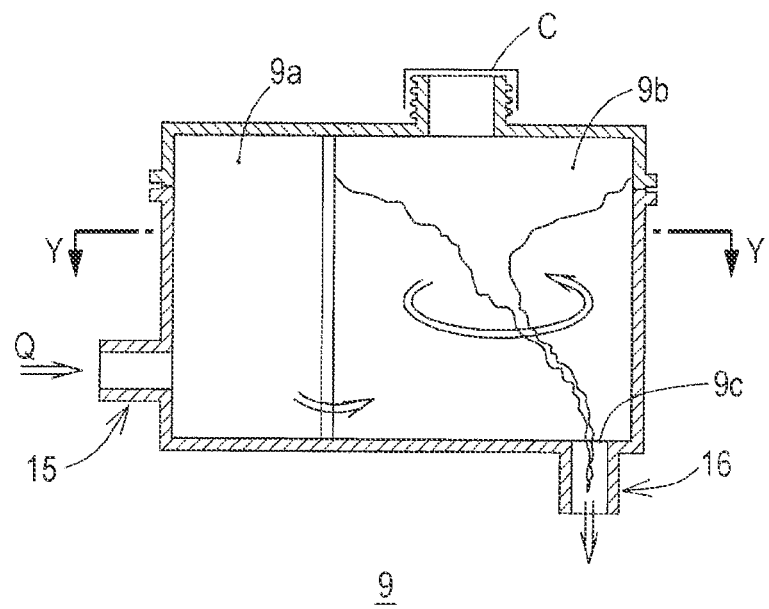
FIG. 6A is a vertical cross-sectional view illustrating the operation of the reservoir tank of a reference example.
Figure 6B:
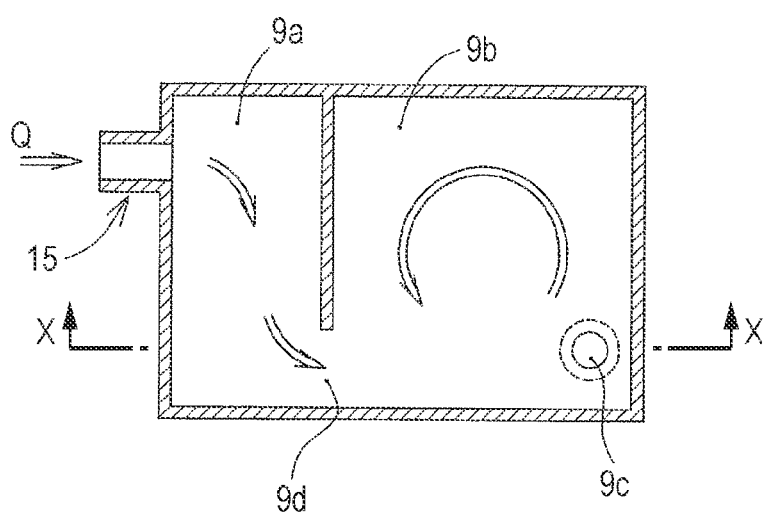
FIG. 6B is a horizontal cross-sectional view illustrating the same.

FIGS. 6A and 6B are respectively a vertical cross-sectional view and a horizontal cross-sectional view illustrating a flow of the cooling fluid in a reservoir tank 9 of a reference example 1. The reservoir tank 9 of the reference example 1 has the same configuration as the reservoir tank 10 of the first embodiment except that the shield 14 and the peripheral wall 18 are not provided.

In FIGS. 6A and 6B, a flow Q of the cooling fluid flowing in the reservoir tank 9 is indicated by a white arrow. In the reservoir tank 9 of the reference example 1, the cooling fluid flows vigorously from the inflow pipe 15 into a front chamber 9a of the tank body. The cooling fluid having flowed into the front chamber 9a of the tank body flows into a tank chamber 9b through an inflow port 9d, and flows out from the tank chamber 9b to the discharge pipe 16. Here, the vortex is generated in the tank chamber 9b depending on, for example, a positional relationship of the inflow port 9d with respect to the tank chamber 9b. Such a vortex also contributes to gas-liquid separation in the tank chamber 9b. Therefore, a design may be made in which the vortex is positively generated in the tank chamber 9b.

In the tank chamber 9b, the air collects in a downward conical shape at a center of the vortex. The inventors have found a phenomenon in which, in the center of the vortex, a portion corresponding to an apex of conical air extends in a tornado shape downward into the cooling fluid and reaches the discharge port 9c and the discharge pipe 16. If the vortex in the tank chamber 9b is strong, such a tornado-shaped air column is likely to occur. When this phenomenon occurs, the air is supplied from the tornado-shaped air column to the discharge port 9c. Therefore, the air is sent out together with the cooling fluid, and the air or the air bubbles are mixed in the cooling fluid.

The air and the air bubbles in the cooling fluid reduce a circulation efficiency of the cooling fluid and heat transport efficiency by the cooling fluid, resulting in the poorer cooling performance of the cooling system.

In the reservoir tank 10 of the first embodiment, the shield 14 is disposed above the discharge port 17c so as to cover the discharge port 17c in a plan view. As illustrated in FIGS. 4A and 4B, even when the vortex is generated in the tank chamber 17b, and the air at the center of the vortex extends into the cooling fluid in a tornado shape, presence of the shield 14 suppresses the air column in a tornado shape from reaching the discharge port 17c, and the air from flowing out. Thus, it is possible to suppress the mixing of the air or the air bubbles into the cooling fluid.

Further, in the reservoir tank 10 of the first embodiment, the shield 14 is preferably disposed at the position away from the discharge port 17c by the predetermined distance. Further, the peripheral wall 18 extending in the substantially vertical direction is preferably provided between the part (section A) of the peripheral edge of the shield 14 and the part of the peripheral edge of the discharge port 17c facing the section A. On the other hand, the opening 191 is preferably provided between the other part (section B) of the peripheral edge of the shield 14 and the other part of the peripheral edge of the discharge port 17c facing the section B. In this case, the cooling fluid flowing in the tank chamber 17b can be selectively guided to the discharge port 17c. Therefore, it is possible to suppress the air bubbles contained in the cooling fluid having flowed into the tank chamber 17b from being directly discharged from the discharge port. Thus, the air bubbles are easily separated from the cooling fluid, so that the mixing of the air or the air bubbles into the cooling fluid can be further suppressed.

Further, in the reservoir tank 10 of the first embodiment, the section A where the peripheral wall 18 is provided is preferably located on the central portion O side of the tank chamber 17b with respect to the central portion of the shield 14 in a plan view. In this case, the mixing of the air or the air bubbles into the cooling fluid is further suppressed. The reason is as follows. That is, when the vortex is generated in the tank chamber 17b, the tornado-shaped air column is likely to be generated in a center of the tank chamber 17b. Therefore, when the peripheral wall 18 is located on the central portion side of the tank chamber 17b, it is easy to prevent the tornado-shaped air column from reaching the discharge port 17c.

Further, particularly in the reservoir tank 10 of the first embodiment, it is preferred that the tank chamber 17b is provided with the inflow port 17d through which the cooling fluid flows in, and the section A where the peripheral wall 18 is provided is located on the side of the inflow port 17d with respect to the central portion of the shield 14 in a plan view. In this case, the mixing of the air or the air bubbles into the cooling fluid is further suppressed. The reason is as follows. That is, even if the air bubbles are mixed in the cooling fluid flowing from the inflow port 17d into the tank chamber 17b, since the peripheral wall 18 is provided, it is possible to suppress the cooling fluid or the air bubbles from being directly sucked into the discharge port 17c. Therefore, the air bubbles are easily separated from the cooling fluid in the tank chamber 17b.

Further, particularly in the reservoir tank 10 of the first embodiment, the section A where the peripheral wall 18 is provided is preferably located upstream of the flow of the vortex generated in the tank chamber 17b with respect to the central portion of the shield 14 in a plan view. In this case, the mixing of the air or the air bubbles into the cooling fluid is further suppressed. The reason is as follows. That is, even if the air bubbles are mixed in the cooling fluid flowing in a vortex shape in the tank chamber 17b, since the peripheral wall 18 is provided, it is possible to suppress the cooling fluid or the air bubbles from being directly sucked into the discharge port 17c. Therefore, the air bubbles are easily separated from the cooling fluid in the tank chamber 17b.

The aspects of the present disclosure are not limited to the above embodiment, but can be implemented with various modifications. Hereinafter, other embodiments of the present disclosure will be described. In the following description, portions different from the above embodiment will be mainly described, and the same portions will be denoted by the same reference numerals and detailed description thereof will be omitted. Further, the embodiments can be implemented by combining some of them or replacing some of them.

Figure 5A:
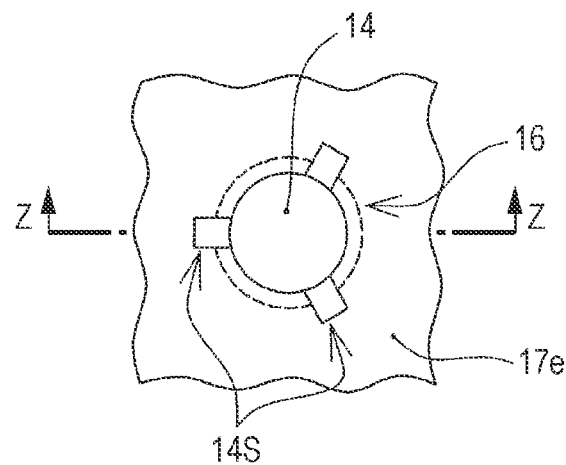
FIG. 5A is a plan view illustrating a shape of a modification of the shield.
Figure 5B:
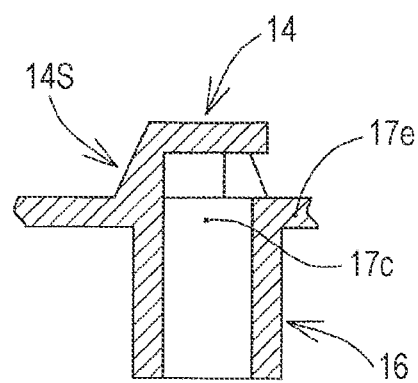
FIG. 5B is a vertical cross-sectional view illustrating the same.

FIGS. 5A and 5B illustrate another embodiment of the reservoir tank having the shield. FIGS. 5A and 5B are respectively a plan view and a cross-sectional view around the shield 14. In the present embodiment, the shield 14 is supported on the bottom surface 17e by three columnar supports 14S. In this manner, the shield 14 may be configured not to have the peripheral wall. The shield 14 is only required to be disposed to cover the discharge port 17c from above so that the tornado-shaped air is suppressed from reaching the discharge port 17c and the discharge pipe 16.

Like the shield 14 of the embodiment illustrated in FIGS. 5A and 5B and the first embodiment, the shield 14 preferably has the same size as the discharge port 17c or a size slightly smaller than the discharge port 17c, because the shield 14, the bottom surface 17e of the tank chamber 17b, the discharge pipe 16, the peripheral wall 18, the support 14S, and the like can be easily integrally molded by injection molding.

Further, in the first embodiment, the discharge port 17c is provided in the bottom surface 17e of the tank chamber 17b. Alternatively, the discharge port 17c may be provided at the position adjacent to the bottom surface 17e of the tank chamber 17b (for example, in a side surface of the tank chamber 17b). In this case, the discharge port 17c can be opened in a substantially horizontal direction, and the discharge pipe 16 can be extended in a substantially horizontal direction. In this case, the shield 14 is only required to be provided above an upper edge of the discharge port 17c, preferably at a position adjacent to the upper edge of the discharge port 17c, so as to cover the discharge port 17c in a plan view.

In the first embodiment, a shape of the bottom surface 17e of the tank chamber 17b is a substantially horizontal flat surface. Alternatively, the shape of the bottom surface 17e of the tank chamber 17b may be another shape. For example, the bottom surface 17e of the tank chamber 17b may be inclined. Further, the bottom surface 17e of the tank chamber 17b may be a curved surface or a spherical shell-shaped curved surface. Further, the bottom surface 17e of the tank chamber 17b may be a tray-shaped bottom surface having a peripheral edge formed to rise.

In the reservoir tank 10 of the above embodiment, shapes of the tank body 17 and the tank chamber 17b are rectangular parallelepiped. In this regard, the shapes of the tank body 17 and the tank chamber 17b of the reservoir tank 10 are not limited to a rectangular parallelepiped shape. For example, the shape of the tank chamber 17b may be spherical. The shape of the tank chamber 17b is not particularly limited, and may be another shape such as a cylindrical shape, an elliptical cylinder shape, or an ellipsoidal shape.

Further, in the description of the above embodiment, the front tank chamber 17a and the tank chamber 17b are partitioned by the partition wall 13. In this regard, it is not essential that both chambers be separated by the partition wall 13. For example, in the reservoir tank 10, it may be configured such that the front tank chamber 17a and the tank chamber 17b are provided independently in the tank body 17, and a tubular inflow port communicates between the front tank chamber 17a and the tank chamber 17b.

Further, the number of tank chambers included in the reservoir tank may be one or plural. The reservoir tank may have three or more tank chambers. Further, the reservoir tank may have a gas-liquid separation structure. The gas-liquid separation structure may be a structure in which the air bubbles are separated while the cooling fluid flows in a labyrinth-like manner in the tank chambers, or a structure in which the gas-liquid separation is performed using centrifugal force. Examples of the latter structure include a structure in which the gas-liquid separation is performed by creating the vortex inside the tank chamber.

Further, in the above embodiment, the discharge pipe 16 is directly connected to the discharge port 17c of the tank chamber 17b. In this regard, it is not essential that the discharge pipe 16 be directly connected to the discharge port 17c. For example, another tank chamber or a passage may be further disposed between the discharge port 17c and the discharge pipe 16, and both may be connected via the other tank chamber or the passage.

Further, the inflow pipe 15 may be extended inside the tank body 17. For example, the inflow pipe may be configured to include an external pipe (15) provided outside the tank body 17 and an internal pipe (extension portion) provided inside the tank body 17. The external pipe and the internal pipe are connected to each other to form a single pipe line. The internal pipe may share a part of the pipe wall with the tank body 17.

An extension of the inflow pipe, that is, the internal pipe, allows the flow of cooling fluid flowing in from the inflow pipe to be directed in a preferred direction (for example, vertically downward). Further, since the inflow pipe is provided extending inside the tank body 17, a degree of freedom in placing the inflow pipe (15) located outside the tank body 17 can be increased. Therefore, the internal pipe may have a pipe line portion extending in the substantially vertical direction.

The reservoir tank according to the embodiment of the present disclosure may have still another configuration. For example, the reservoir tank may be provided with a removable cap C. After such a cap C is removed, the tank or the cooling fluid circuit can be filled with the cooling fluid. Further, the cap C may be provided with a pressure release valve. Further, a stay, a boss member, or the like for attaching the reservoir tank to a vehicle body or the like may be integrated with the reservoir tank as necessary. Furthermore, the reservoir tank may be provided with a reinforcing structure such as a rib depending on a pressure resistance or the like required for the reservoir tank.

The reservoir tank according to the embodiments of the present disclosure can be used in the cooling fluid circuit of the cooling system. The reservoir tank according to the embodiments of the present disclosure can suppress the generation of the air bubbles in the cooling fluid, and thus has a high industrial utility value.

Further, the reservoir tank according to the embodiments of the present disclosure may be the following first and second reservoir tanks.

The first reservoir tank is a reservoir tank provided in the cooling fluid circuit of the liquid-cooled cooling system, including: a tank body that stores the cooling fluid; the inflow pipe for feeding the cooling fluid from the cooling fluid circuit into the tank body; and the discharge pipe for discharging the cooling fluid from the tank body to the cooling fluid circuit, in which the tank body has at least one tank chamber, the discharge port is provided in the bottom surface of the tank chamber or at the position adjacent to the bottom surface, the discharge pipe is connected to the discharge port, and the shield is disposed above the discharge port so as to cover the discharge port in a plan view.

The second reservoir tank is the first reservoir tank, in which the shield is disposed at the position away from the discharge port by the predetermined distance, and the peripheral wall extending in the substantially vertical direction blocks between the peripheral edge of the shield and the peripheral edge of the discharge port over a predetermined section, while on an opposite side of the section, an opening is provided between the peripheral edge of the shield and the peripheral edge of the discharge port.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A reservoir tank comprising:
    a tank body that stores cooling fluid;
    an inflow pipe for feeding the cooling fluid into the tank body; and
    a discharge pipe for discharging the cooling fluid from the tank body, wherein
    the tank body has at least one tank chamber,
    a discharge port is provided in a bottom surface of the tank chamber or at a position adjacent to the bottom surface,
    the discharge pipe is connected to the discharge port,
    a shield is disposed above the discharge port so as to cover the discharge port in a plan view,
    the shield is disposed at a position away from the discharge port by a predetermined distance,
    a peripheral wall extending in a substantially vertical direction is provided between a part of a peripheral edge of the shield and a part of a peripheral edge of the discharge port facing the part of the peripheral edge of the shield, and
    an opening is provided between the other part of the peripheral edge of the shield and the other part of the peripheral edge of the discharge port facing the other part of the peripheral edge of the shield.

2. The reservoir tank according to claim 1, wherein the peripheral wall is located on a central portion side of the tank chamber with respect to a central portion of the shield in a plan view.

3. The reservoir tank according to claim 1, wherein
    the tank chamber is provided with an inflow port through which the cooling fluid flows in, and the peripheral wall is located on a side of the inflow port with respect to a central portion of the shield in a plan view.

4. The reservoir tank according to claim 1, wherein the peripheral wall is located upstream of flow of a vortex generated in the tank chamber with respect to a central portion of the shield in a plan view.

\* \* \* \* \*